US012590211B2

(12) United States Patent
Cook et al.

(10) Patent No.: US 12,590,211 B2
(45) Date of Patent: Mar. 31, 2026

(54) COMPOSITIONS AND METHODS OF MAKING A GREEN BODY OR A PRINTED ARTICLE USING THE SAME

(71) Applicant: Corning Incorporated, Corning, NY (US)

(72) Inventors: Laura Beth Cook, Corning, NY (US); Laura Jeanne Cunneen, Lawrenceville, PA (US)

(73) Assignee: CORNING INCORPORATED, Corning, NY (US)

( * ) Notice: Subject to any disclaimer, the term of this patent is extended or adjusted under 35 U.S.C. 154(b) by 629 days.

(21) Appl. No.: 17/779,009

(22) PCT Filed: Nov. 24, 2020

(86) PCT No.: PCT/US2020/061915
§ 371 (c)(1),
(2) Date: May 23, 2022

(87) PCT Pub. No.: WO2021/108347
PCT Pub. Date: Jun. 3, 2021

(65) Prior Publication Data
US 2022/0411650 A1     Dec. 29, 2022

Related U.S. Application Data

(60) Provisional application No. 62/941,155, filed on Nov. 27, 2019.

(51) Int. Cl.
*C09D 11/101* (2014.01)
*B28B 1/00* (2006.01)
(Continued)

(52) U.S. Cl.
CPC ............ *C09D 11/101* (2013.01); *B28B 1/001* (2013.01); *B29C 64/165* (2017.08); *B33Y 10/00* (2014.12);
(Continued)

(58) Field of Classification Search
None
See application file for complete search history.

(56) References Cited

U.S. PATENT DOCUMENTS

| | | | |
|---|---|---|---|
| 4,158,688 A | 6/1979 | Pett | |
| 4,255,243 A | 3/1981 | Coqueugniot et al. | |

(Continued)

FOREIGN PATENT DOCUMENTS

| | | |
|---|---|---|
| CN | 1352672 A | 6/2002 |
| CN | 103756293 A | 4/2014 |

(Continued)

OTHER PUBLICATIONS

Understanding Colloidal Silica: Applications and Benefits—What is Colloidal Silica from Chempoint. [online]. [Retrieved on Jun. 14, 2025]. Retrieved from internet<URL:https://www.chempoint.com/insights/what-is-colloidal-silica>. (Year: 2025).*

(Continued)

*Primary Examiner* — Sanza L. McClendon

(57) ABSTRACT

A composition can comprise particles comprising 5% by weight (wt %) or more, a photo-initiator, a curing agent, a dispersant, and an organic binder. The composition can be substantially solvent-free. In some embodiments, particles comprise 65 wt % or more. In some embodiments, the curing agent comprises dipropylene-glycol diacrylate. In some embodiments, the dispersant comprises a phosphate ester. In some embodiments, the organic binder comprises isobornyl methacrylate. In some embodiments, the composition comprises a viscosity from about 100 milliPascal-seconds to (Continued)

about 7,000 milliPascal-seconds. Methods of making a green body can comprise creating a composition, printing the green body using the composition, and curing the green body. Method of making a printed article can comprise creating a composition, printing a green body using the composition, curing the green body, heating the green body to remove the organic binder to form a porous article, and sintering the porous article to form the printed article.

20 Claims, 3 Drawing Sheets

(51) Int. Cl.

| | |
|---|---|
| *B29C 64/165* | (2017.01) |
| *B33Y 10/00* | (2015.01) |
| *B33Y 70/10* | (2020.01) |
| *C09D 11/037* | (2014.01) |
| *C09D 11/107* | (2014.01) |
| *B29K 509/02* | (2006.01) |
| *B29K 509/08* | (2006.01) |

(52) U.S. Cl.
CPC ............ *B33Y 70/10* (2020.01); *C09D 11/037* (2013.01); *C09D 11/107* (2013.01); *B29K 2509/02* (2013.01); *B29K 2509/08* (2013.01); *B29K 2995/0026* (2013.01)

(56) References Cited

U.S. PATENT DOCUMENTS

| | | | | |
|---|---|---|---|---|
| 5,496,682 | A | 3/1996 | Quadir et al. | |
| 5,602,197 | A | 2/1997 | Johnson et al. | |
| 6,117,612 | A * | 9/2000 | Halloran .............. | G03F 7/0047 |
| | | | | 430/269 |
| 6,299,799 | B1 | 10/2001 | Craig et al. | |
| 6,899,948 | B2 | 5/2005 | Zhang et al. | |
| 7,677,058 | B2 | 3/2010 | Hawtof et al. | |
| 7,927,538 | B2 * | 4/2011 | Moszner ................. | A61L 27/46 |
| | | | | 430/269 |
| 8,603,612 | B2 | 12/2013 | Chopra et al. | |
| 9,527,244 | B2 | 12/2016 | El-Siblani | |
| 10,023,500 | B2 | 7/2018 | O'Brien et al. | |
| 10,456,886 | B2 | 10/2019 | Ganapathiappan et al. | |
| 11,053,154 | B2 | 7/2021 | Li et al. | |
| 11,912,860 | B2 * | 2/2024 | Cook ...................... | C08L 63/00 |
| 2005/0040562 | A1 * | 2/2005 | Steinmann ............ | G03F 7/0037 |
| | | | | 264/401 |
| 2012/0129972 | A1 | 5/2012 | Hall et al. | |
| 2015/0072083 | A1 | 3/2015 | Nebioglu et al. | |
| 2016/0023384 | A1 | 1/2016 | Spyrou et al. | |
| 2016/0346997 | A1 | 12/2016 | Lewis et al. | |
| 2017/0342282 | A1 | 11/2017 | Torfs et al. | |
| 2019/0071578 | A1 | 3/2019 | Goethals | |
| 2021/0047510 | A1 | 2/2021 | Cook et al. | |

FOREIGN PATENT DOCUMENTS

| | | | |
|---|---|---|---|
| CN | 104419318 | A | 3/2015 |
| CN | 105176084 | A | 12/2015 |
| CN | 105189620 | A | 12/2015 |
| CN | 108137975 | A | 6/2018 |
| KR | 10-2015-0077649 | A | 7/2015 |
| WO | 2016/137956 | A1 | 9/2016 |
| WO | 2017/027788 | A1 | 2/2017 |
| WO | 2019/005798 | A1 | 1/2019 |
| WO | 2020/005411 | A1 | 1/2020 |

OTHER PUBLICATIONS

Colloidal silica facts: What is silica? from Nouryon. [online]. [retrieved on Jun. 14, 2025]. Retrieved from internet <URL:https://www.nouryon.com/products/colloidal-silica/what-is-silica/#:~:text=Standard%20colloidal%20silica%20dispersions%20are,chloride%2C%20lithium%2C%20potassium)> (Year: 2025).*

National Center for Biotechnology Information. PubChem Compound Summary for CID 6590, Isobutyric Acid. https://pubchem.ncbi.nlm.nih.gov/compound/Isobutyric-Acid. Accessed Jul. 29, 2025. (Year: 2025).*

Kim et al. Effect of Slurry Viscosity and Dispersant Agent on the Sintering of 3Y-TZP Ceramics Fabricated by Slip Casting. Journal of Nanoscience and Nanotechnology, vol. 19, No. 2, Feb. 2019, pp. 1118-1121(4). (Year: 2019).*

Wang C, Mao X, Peng YP, Jiang B, Fan J, Xu Y, Zhang L, Zhao J. Preparation and Optical Properties of Infrared Transparent 3Y-TZP Ceramics. Materials (Basel). Apr. 7, 2017;10(4):390. (Year: 2017).*

Chinese Patent Application No. 202080081973.6, Office Action dated Nov. 8, 2023, 5 pages (English Translation only), Chinese Patent Office.

3D printed glass: surface finish and bulk properties as a function of the printing process. Klein and Simske of HP Labs, Avery of Bristol Centre for Functional Nanomaterials, Richardson and Bartlett of U of Bristol, Frei of U of Portsmouth. 2015. HP Laboratories.

Additive manufacturing of ceramic-based materials. Travitzky, Bonet, Dermeik, Fey, Filbert-Demut, Schlier, Schlordt, and Greil of U of Erlangen-Nuremberg (Germany). Advanced Engineering Materials, vol. 16, Issue 6, 2014, pp. 729-754.

Christophe Chaput, et al., "Fabrication of ceramics by stereolithography", Rtejournal—Forum fur Rapid Technologie, 2007.

Frederik Kotz, "Three-dimensional printing of transparent fused silica glass", Nature, vol. 544, Apr. 2017, pp. 337-340.

Grant Marchelli, et al., "The guide to glass 3D printing: Developments, methods, diagnostics, and results", Rapid Prototyping Journal, 2010.

Maciej Wozniak, et al., "Highly Loaded UV curable nanosilica dispersions for rapid prototyping applications", Journal of the European Ceramic Society, vol. 29, Issue 11, Aug. 2009, pp. 2259-2265.

Maciej Wozniak, et al., "Rheology of UV curable colloidal silica dispersions for rapid prototyping applications", Journal of the European Ceramic Society, vol. 31, Issue 13, Nov. 2011, pp. 2221-2229.

International Search Report and Written Opinion of the International Searching Authority; PCT/US20/61915; Mailed Mar. 29, 2021; 13 Pages; Commissioner for Patents.

* cited by examiner

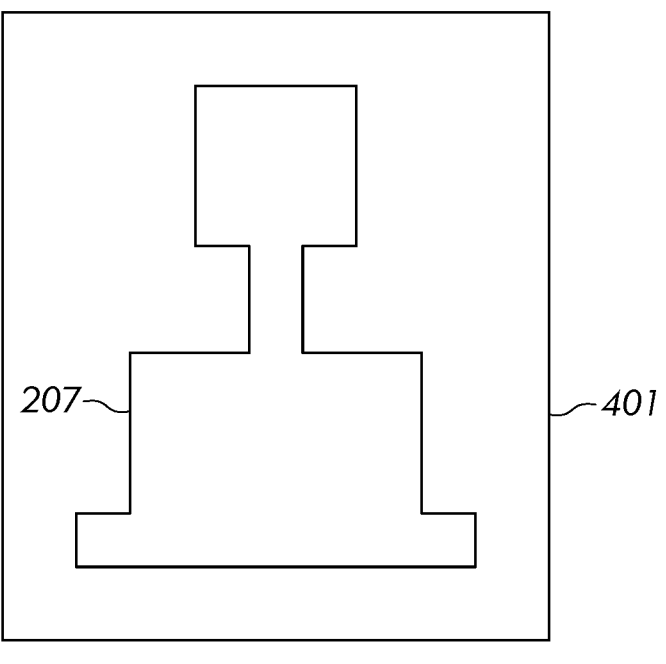
FIG. 4
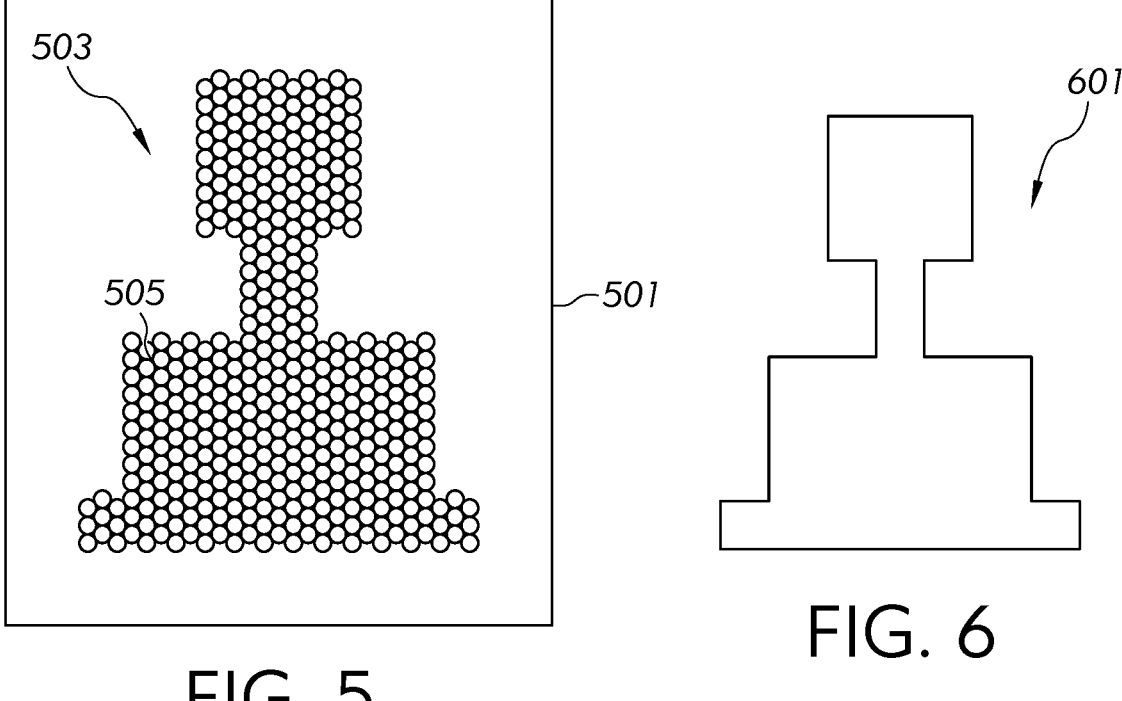
FIG. 5
FIG. 6

COMPOSITIONS AND METHODS OF MAKING A GREEN BODY OR A PRINTED ARTICLE USING THE SAME

CROSS REFERENCE TO RELATED APPLICATIONS

This application claims the benefit of priority under 35 U.S.C. § 371 of International Application No. PCT/US2020/061915, filed on Nov. 24, 2020, which claims the benefit of priority under 35 U.S.C. § 119 of U.S. Provisional Application No. 62/941,155, filed Nov. 27, 2019, the content of each of which is incorporated herein by reference in its entirety.

FIELD

The present disclosure relates generally to compositions and methods of making a green body or a printed article using the same and, more particularly, to compositions comprising particles and methods of making a green body or a printed article using the same.

BACKGROUND

It is known to use additive manufacturing (AM) techniques to form green bodies and/or printed articles. For example, AM can be used for rapid prototyping (RP) and/or the fabrication of specialty components. AM can comprise stereolithography (SLA), three-dimensional (3D) printing, fused deposition modeling (FDM), solid free-form fabrication (SFF), and/or laminated object manufacturing (LOM). Methods of AM can be controlled based on computer-aided design (CAD) data. Methods of AM can comprise layer-by-layer deposition. AM can produce parts with complex geometries without complex tooling and with minimal production set-up time.

It is known to use curable compositions in AM processes. Printing techniques include the above-mentioned methods as well as screen printing, flexographic printing, jet dispersing, and/or inkjet printing. Printing techniques can deposit a composition in a predetermined pattern. When printing techniques are used to apply curable materials, the curable material may be subjected to a curing process.

However, AM using known curable compositions that are shear-thickening (e.g., thixotropic) can limit the production rate and/or lead to equipment malfunction (e.g., clogging, wearing), which can increase the time and/or cost associated with AM. Additionally, curable compositions comprising particles can have agglomeration issues that can lead to equipment malfunction. Similarly, curable compositions comprising particles may have poor wetting of the particles. Further, curable compositions comprising particles can have limited stability (e.g., before settling and/or sedimentation of particles occurs) that increases the costs and/or complexity of AM. Curable compositions commonly comprise solvents, for example, protic solvents such as water, in combination with rheology modifiers (e.g., thickeners). The use of solvents and/or thickeners can impair curing speed. Additionally, the use of solvents and/or thickeners can reduce the quality of the resulting green body or printed article. The green body or printed article can comprise poor optical transparency (e.g., not optically transparent), for example, because of trapped microbubbles, large pore formation, and/or incomplete removal of binders, thickeners, and/or solvents. Also, such compositions can lead to excessive shrinkage during sintering and/or decreased strength of the green body and/or printed article.

Alternatively, 3D glass-based and ceramic-based parts can be manufactured by processes such as molding and pressing. These processes require specialized tooling, such as molds, which can make it difficult to produce parts quickly. The more complex the geometry of the part, the longer and more expensive it will take to produce the part by traditional methods such as molding and pressing. For complex glass-based and ceramic-based parts in short runs, additive manufacturing may be an attractive option.

Consequently, there is a need to minimize (e.g., decrease, reduce, eliminate) shear-thickening behavior in compositions. Also, there is a need for compositions comprising increased loading (e.g., weight %) of particles that comprise printable viscosities and demonstrate increased stability (e.g., decreased settling, decreased sedimentation). Further, there is a need to reduce the time and/or cost associated with AM using such compositions. Additionally, there is a need for faster curing compositions. As well, there is a need for compositions capable of producing green bodies and/or printed articles comprising good optical transparency. Further, there is a need for compositions capable of producing green bodies and/or printed articles comprising good dimensional stability. Moreover, there is a need for compositions capable of producing printed articles with reduced shrinkage and/or increased strength.

SUMMARY

There are set forth herein compositions and methods for making green bodies and/or printed articles using the same. The compositions of the disclosure can reduce the time and/or cost associated with additive manufacturing, for example, to produce green bodies and/or printed articles. Also, the compositions of the disclosure can comprise high loading (e.g., about 65% by weight or more) of particles with good stability and/or wetting of the particles. Methods of using the compositions of the disclosure can additionally produce optically transparent green bodies and/or printed articles exhibiting good dimensional stability and/or mechanical strength.

Compositions of the embodiments of the disclosure can reduce the time and/or cost associated with additive manufacturing, the production of green bodies, and/or the production of printed articles. Such compositions have decreased (e.g., reduced, no) shear-thickening behavior, which can enable increased processing speeds and/or reduce equipment damage. Such compositions comprise good wetting of particles, which can enable increased stability of the composition (e.g., decreased and/or reduced settling, sedimentation). Such compositions can comprise printable viscosities (e.g., in a range from about 100 milliPascal-seconds (mPa-s) to about 7,000 mPa-s), which can be used in additive manufacturing even when the composition comprises a high loading (e.g., about 65% by weight or more) particles. Providing a composition that is substantially solvent-free can increase the curing rate of the composition, which can decrease processing time. Providing a composition that can be substantially solvent-free can reduce (e.g. decrease, eliminate) the use of rheology modifiers and increase composition homogeneity, which can improve the quality of the resulting green body and/or printed article. Providing a composition that is substantially solvent-free can increase the optical transparency of the resulting green body and/or printed article. Providing a composition comprising a high loading (e.g., about 65% or more by weight) of particles can decrease (e.g., reduce) the materials costs associated with the other components of the composition. Providing a composition comprising particles comprising an accessible surface area that substantially comprises oxides (e.g., a composition without surface modification of the particles and/or coupling agents) can reduce the cost of the composition.

Compositions of the embodiments of the disclosure can be used in methods of making a green body and/or a printed article. As discussed above, methods using the composition of the embodiments of the disclosure can reduce the time and/or cost associated with such methods. Also, methods of the embodiments of the disclosure can produce high-quality green bodies and/or printed articles. Providing a composition comprising a high loading (e.g., about 65% or more by weight) of particles can increase the dimensional stability and/or strength of the green body and/or printed article. Providing a composition comprising a high loading (e.g., about 65% or more by weight) can decrease (e.g., reduce) shrinkage associated with sintering to form a printed article. Providing a composition comprising a high loading (e.g., about 65% or more by weight) can increase optical transparency of the green body and/or printed article. Providing a composition comprising particles comprising an accessible surface area that substantially comprises oxides (e.g., a composition without surface modification of the particles and/or coupling agents) can increase the optical transparency of the green body and/or printed article. Providing a composition that is substantially solvent-free can increase the dimensional stability and/or strength of the green body and/or printed article. Providing a composition that is substantially solvent-free can decrease (e.g., reduce) shrinkage associated with sintering to form a printed article. Providing a composition that is substantially solvent-free can increase optical transparency of the green body and/or printed article.

Some example embodiments of the disclosure are described below with the understanding that any of the features of the various embodiments may be used alone or in combination with one another.

In some embodiments, a composition can comprise particles that can comprise 5% or more by weight (% wt) of the composition. The composition can comprise a photo-initiator. The composition can comprise a curing agent that can comprise dipropylene-glycol diacrylate. The composition can comprise a dispersant that can comprise a phosphate ester. The composition can comprise an organic binder comprising isobornyl methacrylate. The composition can be substantially solvent-free.

In further embodiments, the % wt of the particles can be about 65% or more.

In further embodiments, the composition can comprise a viscosity in a range from about 100 milliPascal-seconds (mPa-s) to about 7,000 mPa-s.

In some embodiments, a composition can comprise particles that can comprise 65% or more by weight (% wt) of the solvent-free composition. The composition can comprise a photo-initiator. The composition can comprise a curing agent. The composition can comprise a dispersant. The composition can comprise an organic binder. The composition can comprise a viscosity that can be in a range from about 100 milliPascal-seconds (mPa-s) to about 7,000 mPa-s. The composition can be substantially solvent-free.

In further embodiments, the organic binder can comprise isobornyl methacrylate.

In further embodiments, the curing agent can comprise dipropylene-glycol diacrylate.

In further embodiments, the dispersant can comprise a phosphate ester.

In even further embodiments, the viscosity can be in a range from about 3,000 mPa-s to about 5,000 mPa-s.

In further embodiments the % wt of the particles can be in a range from about 70% wt to about 80% wt.

In further embodiments, the particles can comprise a surface pH of about 9 or more.

In even further embodiments, the surface pH of the particles can be in a range from about 10 to about 12.

In further embodiments, the particles can comprise a median particle size in a range from about 3 micrometers to about 7 micrometers.

In further embodiments, the particles can comprise glass-based particles.

In further embodiments, the particles can comprise ceramic-based particles.

In further embodiments, the photo-initiator, the curing agent, and the dispersant can comprise a combined % wt in a range from about 1% wt to about 15% wt.

In further embodiments, the composition comprises a settling rating of 6 or more after about 1 day.

In further embodiments, the organic binder can comprise one or more of an acrylate, an epoxy, or a urethane.

In further embodiments, the particles can comprise an accessible surface area comprising substantially entirely oxides.

In some embodiments, a method of making a green body can comprise creating a composition. The composition can comprise particles that can comprise 5% or more by weight (% wt) of the composition. The composition can comprise a photo-initiator. The composition can comprise a curing agent that can comprise dipropylene-glycol diacrylate. The composition can comprise a dispersant that can comprise a phosphate ester. The composition can comprise an organic binder comprising isobornyl methacrylate. The composition can be substantially solvent-free. The method can comprise printing the green body using the composition. The method can comprise curing the green body.

In further embodiments, the % wt of the particles can be about 65% or more.

In further embodiments, the composition can comprise a viscosity in a range from about 100 milliPascal-seconds (mPa-s) to about 7,000 mPa-s.

In some embodiments, the method of making a green body can comprise creating a composition. The composition can comprise particles that can comprise 65% or more by weight (% wt) of the composition. The composition can comprise a photo-initiator. The composition can comprise a curing agent. The composition can comprise a dispersant. The composition can comprise an organic binder. The composition can comprise a viscosity that can be in a range from about 100 milliPascal-seconds (mPa-s) to about 7,000 mPa-s. The composition can be substantially solvent-free. The method can comprise printing the green body using the composition. The method can comprise curing the green body.

In further embodiments, the green body can be optically transparent.

In some embodiments, a method of making a printed article can comprise creating a composition. The composition can comprise particles that can comprise 65% or more by weight (% wt) of the composition. The composition can comprise a photo-initiator. The composition can comprise a curing agent. The composition can comprise a dispersant. The composition can comprise an organic binder. The composition can comprise a viscosity that can be in a range from about 100 milliPascal-seconds (mPa-s) to about 7,000 mPa-s. The composition can be substantially solvent-free. The method can comprise printing the green body using the composition. The method can comprise curing the composition. The method can comprise heating the cured green body to remove the organic binder to form a porous article. The method can comprise sintering the porous article to form the printed article.

In some embodiments, a method of making a printed article can comprise creating a composition. The composition can comprise particles that can comprise 5% or more by weight (% wt) of the composition. The composition can comprise a photo-initiator. The composition can comprise a curing agent that can comprise dipropylene-glycol diacrylate. The composition can comprise a dispersant that can comprise a phosphate ester. The composition can comprise an organic binder comprising isobornyl methacrylate. The composition can be substantially solvent-free. The method can comprise printing the green body using the composition. The method can comprise curing the green body. The method can comprise heating the cured green body to remove the organic binder to form a porous article. The method can comprise sintering the porous article to form the printed article.

In further embodiments, the % wt of the particle can be about 65% or more of the composition.

In further embodiments, the composition can comprise a viscosity in a range from about 100 milliPascal-seconds (mPa-s) to about 7,000 mPa-s.

In further embodiments, the printed article can be optically transparent.

In even further embodiments, the viscosity can be in a range from about 3,000 mPa-2 to about 5,000 mPa-s.

In further embodiments, the composition can comprise the photo-initiator, the curing agent, and the dispersant comprise a combined % wt in a range from about 1% wt to about 15% wt.

In further embodiments, the particles can comprise glass-based particles.

In further embodiments, the particles can comprise ceramic-based particles.

In further embodiments, the % wt of the particles is in a range from about 70% wt to about 80% wt of the composition.

In further embodiments, the particles can comprise an accessible surface area that can comprise substantially entirely oxides.

BRIEF DESCRIPTION OF THE DRAWINGS

The above and other features and advantages of embodiments of the present disclosure are better understood when the following detailed description is read with reference to the accompanying drawings, in which:

FIG. 4 schematically illustrates a step in the methods of the embodiments of the disclosure;

FIG. 5 schematically illustrates a step in the methods of the embodiments of the disclosure; and FIG. 6 schematically illustrates a printed article in accordance with the embodiments of the disclosure.

Figure 1:
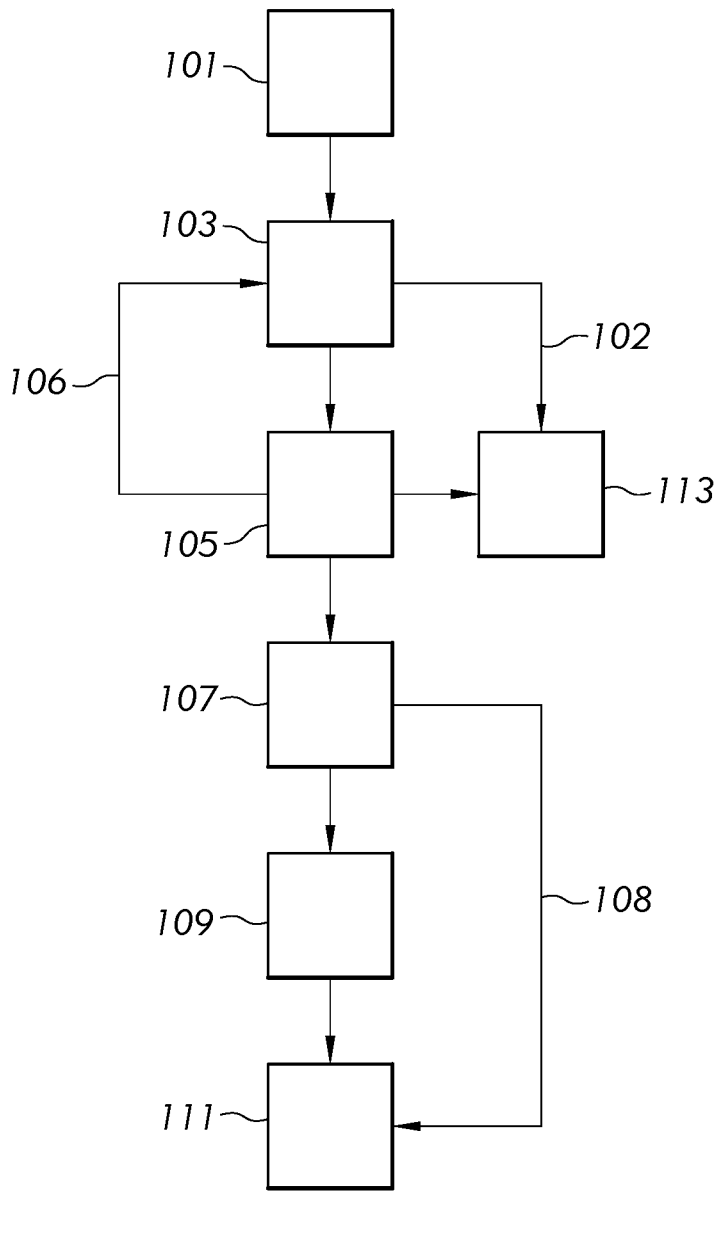
FIG. 1 is a flow chart illustrating example methods of the embodiments of the disclosure.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

DETAILED DESCRIPTION

Embodiments will now be described more fully hereinafter with reference to the accompanying drawings in which example embodiments are shown. Whenever possible, the same reference numerals are used throughout the drawings to refer to the same or like parts. However, claims may encompass many different aspects of various embodiments and should not be construed as limited to the embodiments set forth herein.

Unless otherwise noted, a discussion of features of some embodiments can apply equally to corresponding features of any of the embodiments of the disclosure. For example, identical part numbers throughout the disclosure can indicate that, in some embodiments, the identified features are identical to one another and that the discussion of the identified feature of one embodiment, unless otherwise noted, can apply equally to the identified feature of any of the other embodiments of the disclosure.

Compositions of the embodiments of the disclosure comprise particles. In some embodiments, the particles comprise glass-based particles. In some embodiments, the particles comprise ceramic-based particles.

As used herein, "glass-based" includes both glasses and glass-ceramics, wherein glass-ceramics have one or more crystalline phases and an amorphous, residual glass phase. Glass-based material cool or has already cooled into a glass, glass-ceramic, and/or that upon further processing becomes a glass-ceramic material. A glass-based material (e.g., glass-based substrate) may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion-exchange of larger ions for smaller ions in the surface of the substrate, as discussed below. However, other strengthening methods known in the art, for example, thermal tempering, or utilizing a mismatch of the coefficient of thermal expansion between portions of the substrate to create compressive stress and central tension regions, may be utilized to form strengthened substrates. Exemplary glass-based materials, which may be free of lithia or not, comprise soda lime glass, alkali aluminosilicate glass, alkali-containing borosilicate glass, alkali-containing aluminoborosilicate glass, alkali-containing phosphosilicate glass, and alkali-containing aluminophosphosilicate glass. In one or more embodiments, a glass-based material may comprise, in mole percent (mol %): $SiO_2$ in a range from about 40 mol % to about 80%, $Al_2O_3$ in a range from about 10 mol % to about 30 mol %, $B_2O_3$ in a range from 0 mol % to about 10 mol %, $ZrO_2$ in a range from 0 mol % to about 5 mol %, $P_2O_5$ in a range from 0 mol % to about 15 mol %, $TiO_2$ in a range from 0 mol % to about 2 mol %, $R_2O$ in a range from 0 mol % to about 20 mol %, and RO in a range from 0 mol % to about 15 mol %. As used herein, $R_2O$ can refer to an alkali metal oxide, for example, $Li_2O$, $Na_2O$, $K_2O$, $Rb_2O$, and $Cs_2O$. As used herein, RO can refer to MgO, CaO, SrO, BaO, and ZnO. In some embodiments, a glass-based substrate may optionally further comprise in a range from 0 mol % to about 2 mol % of each of $Na_2SO_4$, NaCl, NaF, NaBr, $K_2SO_4$, KCl, KF, KBr, $As_2O_3$, $Sb_2O_3$, $SnO_2$, $Fe_2O_3$, MnO, $MnO_2$, $MnO_3$, $Mn_2O_3$, $Mn_3O_4$, $Mn_2O_7$. "Glass-ceramics" include materials produced through controlled crystallization of glass. In some embodiments, glass-ceramics have about 1% to about 99% crystallinity. Examples of suitable glass-ceramics may include $Li_2O$—$Al_2O_3$—$SiO_2$ system (i.e. LAS-System) glass-ceramics, MgO—$Al_2O_3$—$SiO_2$ system (i.e. MAS-System) glass-ceramics, $ZnO \times Al_2O_3 \times nSiO_2$ (i.e. ZAS system), and/or glass-ceramics that include a predominant crystal phase including β-quartz solid solution, β-spodumene, cordierite, petalite, and/or lithium disilicate. The glass-ceramic substrates may be strengthened using the strengthening processes described herein. In one or more embodiments, MAS-System glass-ceramic substrates may be strengthened in $Li_2SO_4$ molten salt, whereby an exchange of $2Li^+$ for $Mg^{2+}$ can occur. In some embodiments, the substrate comprising the glass-based substrate can be optically transparent.

As used herein, "ceramic-based" includes both ceramics and glass-ceramics, wherein glass-ceramics have one or more crystalline phases and an amorphous, residual glass phase. In some embodiments, a ceramic-based material can be formed by heating a glass-based material to form ceramic (e.g., crystallin) portions. In further embodiments, ceramic-based materials may comprise one or more nucleating agents that can facilitate the formation of crystalline phase(s). In some embodiments, the ceramic-based materials can comprise one or more oxide, nitride, oxynitride, carbide, boride, and/or silicide. Example embodiments of ceramic oxides include zirconia ($ZrO_2$), zircon zirconia ($ZrSiO_4$), an alkali metal oxide (e.g., sodium oxide ($Na_2O$)), an alkali earth metal oxide (e.g., magnesium oxide (MgO)), titania ($TiO_2$), hafnium oxide ($Hf_2O$), yttrium oxide ($Y_2O_3$), iron oxide, beryllium oxide, vanadium oxide ($VO_2$), fused quartz, mullite (a mineral comprising a combination of aluminum oxide and silicon dioxide), and spinel ($MgAl_2O_4$). Example embodiments of ceramic nitrides include silicon nitride ($Si_3N_4$), aluminum nitride (AlN), gallium nitride (GaN), beryllium nitride ($Be_3N_2$), boron nitride (BN), tungsten nitride (WN), vanadium nitride, alkali earth metal nitrides (e.g., magnesium nitride ($Mg_3N_2$)), nickel nitride, and tantalum nitride. Example embodiments of oxynitride ceramics include silicon oxynitride, aluminum oxynitride, and a SiA-lON (a combination of alumina and silicon nitride and can have a chemical formula, for example, $Si_{12-m-n}Al_{m+n}O_nN_{16-n}$, $Si_{6-n}Al_nO_nN_{8-n}$, or $Si_{2-n}Al_nO_{1+n}N_{2-n}$, where m, n, and the resulting subscripts are all non-negative integers). Example embodiments of carbides and carbon containing ceramics include silicon carbide (SiC), tungsten carbide (WC), an iron carbide, boron carbide ($B_4C$), alkali metal carbides (e.g., lithium carbide ($Li_4C_3$)), alkali earth metal carbides (e.g., magnesium carbide ($Mg_2C_3$)), and graphite. Example embodiments of borides include chromium boride ($CrB_2$), molybdenum boride ($Mo_2B_5$), tungsten boride ($W_2B_5$), iron boride, titanium boride, zirconium boride ($ZrB_2$), hafnium boride ($HfB_2$), vanadium boride ($VB_2$), Niobium boride ($NbB_2$), and lanthanum boride ($LaB_6$). Example embodiments of silicides include molybdenum disilicide ($MoSi_2$), tungsten disilicide ($WSi_2$), titanium disilicide ($TiSi_2$), nickel silicide (NiSi), alkali earth silicide (e.g., sodium silicide (NaSi)), alkali metal silicide (e.g., magnesium silicide ($Mg_2Si$)), hafnium disilicide ($HfSi_2$), and platinum silicide (PtSi).

In some embodiments, the particle can be optically transparent. As used herein, "optically transparent" or "optically clear" means an average transmittance of 70% or more in the wavelength range of 400 nm to 700 nm through a 1.0 mm thick piece of a material. In some embodiments, an "optically transparent material" or an "optically clear material" may have an average transmittance of 75% or more, 80% or more, 85% or more, or 90% or more, 92% or more, 94% or more, 96% or more in the wavelength range of 400 nm to 700 nm through a 1.0 mm thick piece of the material. The average transmittance in the wavelength range of 400 nm to 700 nm is calculated by measuring the transmittance of whole number wavelengths from about 400 nm to about 700 nm and averaging the measurements.

In some embodiments, the particles can comprise a weight percentage of the composition (% wt) of about 5% or more, about 50% or more, about 60% or more, about 70% or more, about 75% or more, about 80% or less, about 75% or less, or about 70% or less. In even further embodiments, the particles can comprise a % wt in a range from about 5% to about 80%, from about 5% to about 75%, from about 5% to about 70%, from about 50% to about 80%, from about 50% to about 75%, from about 50% to about 70%, from about 60% to about 80%, from about 60% to about 75%, from about 60% to about 70%, from about 65% to about 80%, from about 65% to about 75%, from about 65% to about 70%, from about 70% to about 80%, from about 70% to about 75%, or any range or subrange therebetween. Providing a high loading of particles (e.g., about 65% wt or more) can increase the dimensional stability and/or strength of the green body and/or printed article. Also, providing a high loading of particles (e.g., about 65% wt or more) can decrease (e.g., reduce) shrinkage associated with sintering to form a printed article. Providing a high loading of particles (e.g., about 65% wt or more) can increase optical transparency of the green body and/or printed article. Providing a composition comprising a high loading (e.g., about 65% or more by weight) of particles can decrease (e.g., reduce) the materials costs associated with the other components of the composition.

In some embodiments, the particles can comprise a median particle size of about 1 micrometer (μm) or more, about 3 μm or more, about 5 μm or more, about 10 μm or less, about 7 μm or less, or about 5 μm or less. In even further embodiments, the particles can comprise a median particle size in a range from about 1 μm to about 10 μm, from about 1 μm to about 7 μm, from about 1 μm to about 5 μm, from about 3 μm to about 10 μm, from about 3 μm to about 7 μm, from about 3 μm to about 5 μm, from about 5 μm to about 10 μm, from about 5 μm to about 7 μm, or any range or subrange therebetween.

In some embodiments, the particles can comprise a surface pH. As used herein, a surface pH of the particles is measuring the pH of a mixture of 100 grams (g) of particles and 100 g of deionized water. In some embodiments, the surface pH of the particles can be about 9 or more, about 9.5 or more, about 10 or more, about 12 or more, about 15 or less, about 13 or less, about 12 or less, about 11 or less, or about 10 or less. In some embodiments, the surface pH of the particles can be in a range from about 9 to about 15, from about 9 to about 13, from about 9 to about 12, from about 9 to about 11, from about 9 to about 10, from about 9.5 to about 13, from about 9.5 to about 12, from about 9.5 to about 11, from about 9.5 to about 10, from about 10 to about 15, from about 10 to about 13, from about 10 to about 12, from about 10 to about 11, or any range or subrange therebetween. Providing particles comprising an alkaline surface pH (e.g. about 9 or more) can increase the compatibility (e.g., wetting of the particles, stability of the composition) of the components (e.g., particles, curing agent, dispersant, binder) in the composition.

In some embodiments, an accessible surface area of the particles can be substantially entirely oxides. In further embodiments, the accessible surface of the particles can be entirely oxides. As used herein, an accessible surface area of a particle is defined as surface encountered by a probe comprising a diameter of 100 nm. Accessible surface area can be measured using atomic force microscopy (AFM), a scanning electron microscope (SEM), and/or cryo-electron microscopy (cryo-EM). As used herein, an accessible surface area of the particles can be substantially entirely oxides when about 95% or more of the accessible surface area comprises non-oxides. As used herein, oxides comprise a compound comprising an oxide and/or a protonated oxide (e.g., an alcohol). Example embodiments of oxides include without limitation silicon dioxide ($SiO_2$), zirconia ($ZrO_2$), zircon zirconia ($ZrSiO_4$), an alkali metal oxide (e.g., sodium oxide ($Na_2O$)), an alkali earth metal oxide (e.g., magnesium oxide ($MgO$)), titania ($TiO_2$), hafnium oxide ($Hf_2O$), and yttrium oxide ($Y_2O_3$). In some embodiments, the particle may not have undergone a surface modification reaction (e.g., reaction with silane coupling agents). Providing particles comprising an accessible surface area that substantially comprises oxides (e.g., a composition without surface modification of the particles and/or coupling agents) can reduce the cost of the composition. Providing a composition comprising particles comprising an accessible surface area that substantially comprises oxides (e.g., a composition without surface modification of the particles and/or coupling agents) can increase the optical transparency of the green body and/or printed article.

In some embodiments, the composition can comprise a photo-initiator. As used herein a photo-initiator is a compound sensitive to one or more wavelengths that upon absorbing light comprising the one or more wavelengths undergoes a reaction to produce one or more radicals or ionic species that can initiate a polymerization reaction. In further embodiments, the photo-initiator may be sensitive to one or more wavelengths of ultraviolet (UV) light. Example embodiments of photo-initiators sensitive to UV light include without limitation benzoin ethers, benzil ketals, dialkoxyacetophenones, hydroxyalkylphenones, aminoalkylphenones, acylphosphine oxides, thioxanthones, hydroxyalkylketones, and thoxanthanamines. In further embodiments, the photo-initiator may be sensitive to one or more wavelengths of visible light. Example embodiments of photo-initiators sensitive to visible light include without limitation 5,7-diiodo-3-butoxy-6-fluorone, bis (4-methoxybenzoyl) diethylgermanium, bis(2,4,6-trimethylbenzoyl)-phenylphosphineoxide, 3-methyl-4-aza-6-helicene, and thiocyanine borates. In further embodiments, the photo-initiator may be sensitive to a wavelength that the other components of the composition are substantially transparent at. As used herein, a compound (e.g., component of the composition) is substantially transparent at a predetermined wavelength if it comprises an average transmittance of 75% or more (e.g., 80% or more, 85% or more, or 90% or more, 92% or more, 94% or more, 96% or more) through a 1.0 mm thick piece of the compound at the predetermined wavelength. Providing a photo-initiator can enable controlled activation of curing of the composition. Providing a photo-initiator can enable uniform curing of the composition. In further embodiments, the photo-initiator may produce one or more radicals (e.g., free radicals). Example embodiments of photo-initiators producing one or more radicals include acetophenone, anisoin, anthraquinone, benzene, benzil, benzoin, benzoin ethyl ether, benzoin isobutyl ether, benzoin methyl ether, benzophenone, hydroxycyclohexyl phenyl ketone, 4-benzoylbiphernyl, camphorquinone, 2-chlorothioxanthen-9-one, bibezosuberenone, 2-,2-diethyoxyacetophenone, dimethylbenzil, ferrocene, ethylanthraquinone, hydroxyacetophenone, hydroxybenzophenone, thioxanthene-9-one, diphenyl(2,4,6-trimethylbenzoyl)phosphine oxide, and phophineoxide. Example embodiments of photo-initiators producing one or more ions include without limitation triarylsulfonium hexfluoroantimonate and bis(4-tert-butylphenyl)iodonium perfluoro-l-butanesulfonate. Commercially available photo-initiators include without limitation the Irgacure product line from Ciba Specialty Chemical.

In some embodiments, the composition can comprise a curing agent. As used herein, a curing agent is a multifunctional monomer that facilitates polymerization of polymers including branched and/or cross-linked polymers when the photo-initiator is activated. In further embodiments, the curing agent can comprise a multifunctional (e.g., di-functional, tri-functional, tetra-functional) acrylate compound (e.g., monomer). Exemplary embodiments of di-functional acrylate monomers include without limitation dipropylene-glycol diacrylate (e.g., SR-508 (Sartomer)), propylene-glycol dimethacrylate (e.g., SR-644 (Sartomer)), 1,6-hexanediol diacrylate (e.g., Miramer M200 (Miwon)), bisphenol A diacrylate (e.g., Miramer M2100 (Miwon)), tripropylene-glycol diacrylate (TPGDA) (e.g., Photomer 4061 (IGM Resins)), neopentyl-glycol diacrylate (e.g., Photomer 4127 (IGM Resins)), and 1,6-hexanediol ethoxylate diacrylate (e.g., Photomer 4369 (IGM Resins)). An exemplary embodiment of a tri-functional acrylate monomer includes trimethylolpropane trimethacrylate (TMPTMA) (e.g., SR-350 (Sartomer), Photomer 2006 (IGM Resins)). An exemplary embodiment of a tetra-functional acrylate monomer comprises a tetra-functional amine modified polyether acrylate (e.g., Photomer 5662 (IGM Resins)). In even further embodiments, the curing agent can comprise dipropylene-glycol diacrylate. Providing a difunctional curing agent can facilitate a substantially complete cure. Providing a difunctional acrylate curing agent can facilitate a fast cure, which can reduce the time associated with manufacturing an article (e.g., printed article, green body). Providing one or more tri-functional and/or tetra-functional curing agents (e.g., tri-functional and/or tetra-functional curing agents) can facilitate a hard cure, which can be characterized by good strength and/or dimensional stability of the cured green body.

In some embodiments, the composition can comprise a dispersant. As used herein, a dispersant is one or more compounds designed to increase the wetting and/or stability of the particles. In further embodiments, the dispersant can comprise a phosphate ester. An exemplary embodiment of a phosphate ester dispersant includes BYK 180 (Byk-Gardner Gmbh). Providing a dispersant can increase the wetting of the particles, which can facilitate higher loading of particles (e.g., about 65% wt or more). Providing a dispersant can increase the stability of the composition (e.g., decrease settling) and/or improve flow properties of the composition (e.g., decrease shear-thickening).

In some embodiments, the composition can comprise an organic binder. As used herein, an organic binder is a polymerizable unit that is not a curing agent, which includes mono-functional monomers that can act as endcaps for polymers. In further embodiments, the organic binder can comprise monofunctional monomers, monofunctional oligomers, and/or multifunctional oligomers. In further embodiments, the organic binder can comprise an acrylate, an epoxy, and/or a urethane. Example embodiments of acrylates include mono-functional acrylate monomers, di-functional acrylate oligomers, tri-functional acrylate oligomers, and tetra-functional acrylate oligomers. Exemplary embodiments of monofunctional acrylate monomers include without limitation isobornyl methacrylate (e.g., Photomer 2012 (IGM Resins)) and phenoxyethyl acrylate (e.g., Photomer 4035 (IGM Resins)). An exemplary embodiment of a tetra-functional acrylate oligomer includes Photomer 5429 (IGM Resins). Example embodiments of epoxies include without limitation bisphenol-based epoxy resins, novolac-based epoxies, cycloaliphatic-based epoxies, and glycidylamine-based epoxies. An example embodiment of urethanes includes a polyester urethane resin (e.g., N3D-I150 (Sartomer)). In some embodiments, the organic binder can comprise isobornyl methacrylate. In further embodiments, the organic binder can comprise acrylate oligomers. In even further embodiments, the organic binder can comprise a monofunctional acrylate (e.g., isobornyl methacrylate) and a polyurethane resin (e.g., N3D-I150 (Sartomer)). Providing an organic binder can decrease the time to cure the composition because the organic binder can comprise oligomers that are already partially polymerized. Providing an organic binder with substantially the same chemistry (e.g., functionality) as the curing agent can facilitate compatibility and stability of composition. Providing an organic binder comprising a monofunctional monomer and resin (e.g., multi-functional oligomer) can provide a controlled polymerization that has good stability, good flow properties (e.g., viscosity in a range from 100 mPa-s to 7,000 mPa-s, reduced and/or no shear-thickening), and dimensional stability of the composition after it is printed but before it is cured.

In some embodiments, the composition can be substantially solvent-free. In further embodiments, the composition can be solvent-free. In even further embodiments, the composition can be entirely solvent-free. As used herein, a composition is entirely solvent-free if it only contains components that participate in the curing reaction and/or are considers particles, a photo-initiator, a curing agent, an organic binder, or a dispersant based on the above discussion. As used herein, a composition is solvent-free if it contains 99.5% wt or more components that participate in the curing reaction and/or are considers particles, a photo-initiator, a curing agent, an organic binder, or a dispersant based on the above discussion. As used herein a composition is substantially solvent-free if it contains 98% wt or more components that participate in the curing reaction and/or are considers particles, a photo-initiator, a curing agent, an organic binder, or a dispersant based on the above discussion. For example, water and octanol are considered solvents. Solvents can comprise one or more of a polar solvent (e.g., water, an alcohol, an acetate, acetone, formic acid, dimethylformamide, acetonitrile, dimethyl sulfoxone, nitromethane, propylene carbonate, poly(ether ether ketone)) or a non-polar solvent (e.g., pentane, 1,4-dioxane, chloroform, dichloromethane, diethyl ether, hexane, heptane, benzene, toluene, xylene). For example, a composition comprising up to 0.5% wt solvent is considered to be both substantially solvent-free and solvent-free. Likewise, a composition containing no solvent is considered to be substantially solvent-free, solvent-free, and entirely solvent-free. Providing a composition that is substantially solvent-free (e.g., entirely solvent-free) can increase the curing rate of the composition, which can decrease processing time. Providing a composition that is substantially solvent-free (e.g., entirely solvent-free) can reduce (e.g. decrease, eliminate) the use of rheology modifiers and increase composition homogeneity, which can improve the quality of the resulting green body and/or printed article. Providing a composition that is substantially solvent-free (e.g., entirely solvent-free) can increase the optical transparency of the resulting green body and/or printed article.

In some embodiments, the composition can comprise a viscosity of about 10 milliPascal-seconds (mPa-s) or more, about 50 mPa-s or more, about 100 mPa-s or more, about 300 mPa-s or more, about 500 mPa-s or more, about 1,000 mPa-s or more, about 3,000 mPa-s or more, about 10,000 mPa-s or less, about 7,000 mPa-s or less, about 5,000 mPa-s or less, about 2,000 mPa-s or less, or about 1,000 mPa-s or less. In some embodiments, the composition can comprise a viscosity in a range from about 10 mPa-s to about 10,000 mPa-s, from about 10 mPa-s, to about 7,000 mPa-s, from about 10 mPa-s to about 5,000 mPa-s, from about 10 mPa-s to about 2,000 mPa-s, from about 10 mPa-s to about 1,000 mPa-s, from about 100 mPa-s to about 10,000 mPa-s, from about 100 mPa-s to about 7,000 mPa-s, from about 100 mPa-s to about 5,000 mPa-s, from about 100 mPa-s to about 2,000 mPa-s, from about 100 mPa-s to about 1,000 mPa-s, from about 300 mPa-s to about 10,000 mPa-s, from about 300 mPa-s to about 7,000 mPa-s, from about 300 mPa-s to about 5,000 mPa-s, from about 300 mPa-s to about 2,000 mPa-s, from about 300 mPa-s to about 1,000 mPa-s, from about 500 mPa-s to about 10,000 mPa-s, from about 500 mPa-s to about 7,000 mPa-s, from about 500 mPa-s to about 5,000 mPa-s, from about 500 mPa-s to about 2,000 mPa-s, from about 500 mPa-s to about 1,000 mPa-s, from about 1,000 mPa-s to about 10,000 mPa-s, from about 1,000 mPa-s to about 7,000 mPa-s, from about 1,000 mPa-s to about 5,000 mPa-s, from about 1,000 mPa-s to about 2,000 mPa-s, from about 3,000 mPa-s to about 10,000 mPa-s, from about 3,000 mPa-s to about 7,000 mPa-s, from about 3,000 mPa-s to about 5,000 mPa-s, or any range or subrange therebetween.

As used herein, a viscosity of a composition is measured at 25° C. using a rotational rheometer (e.g., RheolabQC from Anton Par). The viscosity can be measured for shear rates in a range from about 0.01 l/s to about 1,000 l/s, from about 0.1 l/s to about 500 l/s, from about 5 l/s to about 200 l/s, from about 10 l/s, to about 100 l/s, from about 20 l/s to about 50 l/s, or any range or subrange therebetween. In some embodiments, the composition can comprise a viscosity at 0.01 l/s within one or more of the above specified viscosity ranges. In further embodiments, the composition can comprise a viscosity averaged over measurements that are 10 logarithmically spaced in terms of shear rate that is within one or more of the above specified ranges. In even further embodiments, the composition can comprise a viscosity comprising 10 logarithmically spaced measurements in terms of shear rate that are all within one or more of the above specified ranges. In further embodiments, the composition can comprise minimal shear thickening, for example, a ratio of a viscosity measured at a shear rate of 100 l/s to a viscosity at a shear rate of 0.01 l/s time can about 10 or less, about 5 or less, about 2 or less, or about 1 or less. Providing compositions with decreased (e.g., reduced, no) shear-thickening behavior can enable increased processing speeds and/or reduce equipment damage.

In some embodiments, the composition can comprise a settling rating. As used herein, a settling rating is measured according to ASTM D869, where after waiting a predetermined amount of time a square-end blade spatula is dropped into the composition in a container and a rating is assigned in a range from 0 to 10. A settling rating of 10 corresponds to a perfect suspension, where there is substantially no change from the original condition of the composition. A settling rating of 8 corresponds to a composition where slight deposit is brought up on the spatula. A settling rating of 6 corresponds to a composition comprising a definite caking, resistance is encountered with sideways movement of the spatula, and significant deposit is brought up on the spatula. A settling rating of 4 correspond to a composition where the spatula does not fall to the bottom of the container under its own weight and it is difficult to move the spatula sideways. As used herein, a settling rating of 6 or more at a predetermined time interval is required for the composition to be considered stable for the predetermined time interval. In further embodiments, the composition can comprise a settling rating of 6 or more after waiting 1 day. In even further embodiments, the composition can comprise a settling rating of 8 or more after waiting 1 day. In even further embodiments, the composition can comprise a settling rating of 6 or more after waiting 3 days. In still further embodiments, the composition can comprise a settling rating of 8 or more after waiting 3 days. In still further embodiments, the composition can comprise a settling rating of 6 or more after waiting 7 days.

Figure 2:
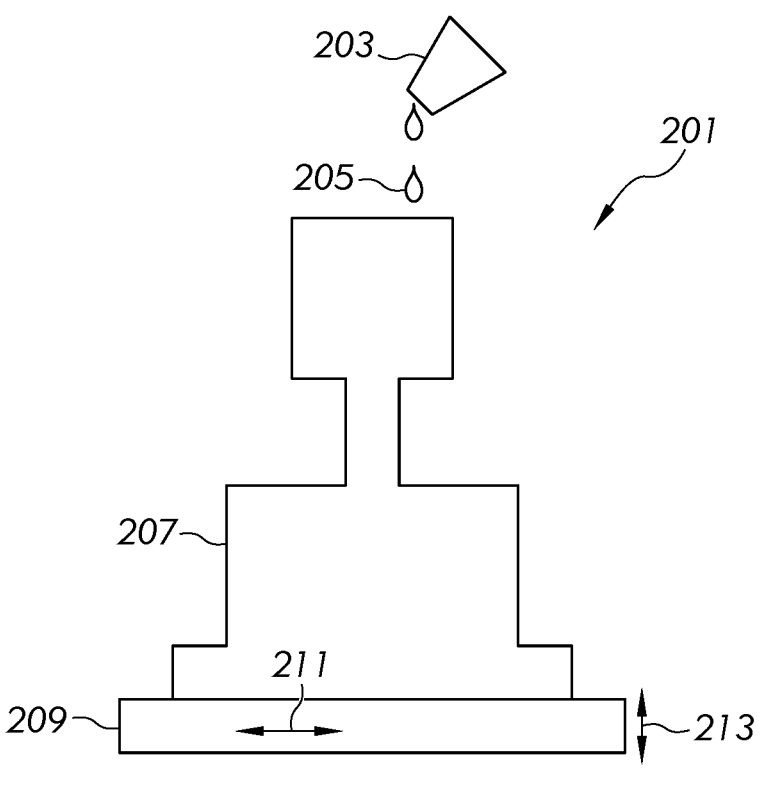
FIG. 2 schematically illustrates a step in the methods of the embodiments of the disclosure.
Figure 3:
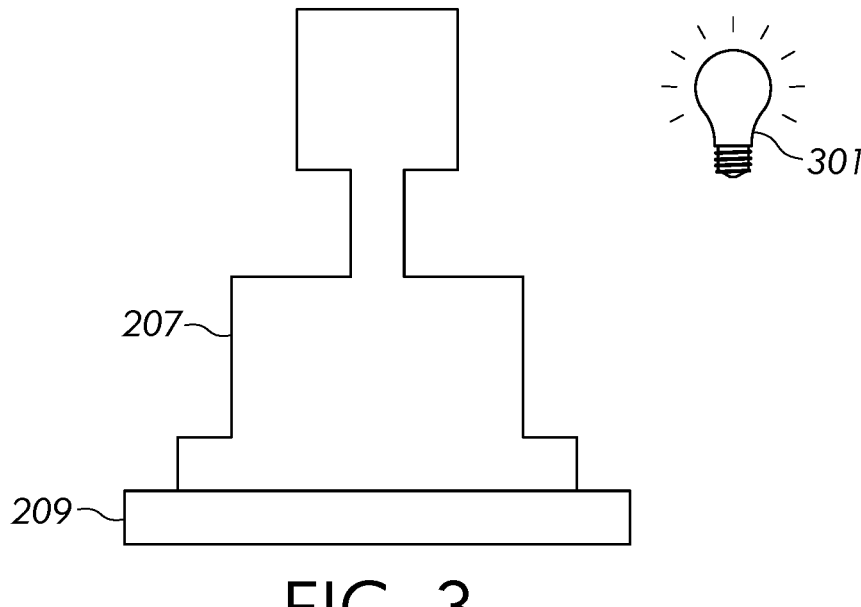
FIG. 3 schematically illustrates a step in the methods of the embodiments of the disclosure.

Embodiments of methods of making a green body in accordance with the embodiments of the disclosure will be discussed with reference to FIGS. 2-3 and the flow chart in FIG. 1.

In a first step 101 of method of making a green body 207, methods can start with providing a composition. In some embodiments, the composition can be provided by purchase or other wise obtaining the composition. In some embodiments, the composition can be provided by creating the composition. In further embodiments, creating the composition can comprise mixing particles with photo-initiator, a curing agent, and an organic binder. In even further embodiments, the particles can comprise a % wt of the composition of about 5% or more, about 50% or more, about 60% or more, about 70% or more, about 75% or more, about 80% or less, about 75% or less, or about 70% or less. In even further embodiments, the particles can comprise a % wt of the composition in a range from about 5% to about 80%, from about 5% to about 75%, from about 5% to about 70%, from about 50% to about 80%, from about 50% to about 75%, from about 50% to about 70%, from about 60% to about 80%, from about 60% to about 75%, from about 60% to about 70%, from about 65% to about 80%, from about 65% to about 75%, from about 65% to about 70%, from about 70% to about 80%, from about 70% to about 75%, or any range or subrange therebetween. In even further embodiments, the particles can comprise glass-based particles. In even further embodiments, the particles can comprise ceramic-based particles. In even further embodiments, the particles can comprise a median particle size of about 1 μm or more, about 3 μm or more, about 5 μm or more, about 10 μm or less, about 7 μm or less, or about 5 μm or less. In even further embodiments, the particles can comprise a median particle size in a range from about 1 μm to about 10 μm, from about 1 μm to about 7 μm, from about 1 μm to about 5 μm, from about 3 μm to about 10 μm, from about 3 μm to about 7 μm, from about 3 μm to about 5 μm, from about 5 μm to about 10 μm, from about 5 μm to about 7 μm, or any range or subrange therebetween. In even further embodiments, glass-based particles and/or ceramic-based particles can be formed by glass-based samples or layers of glass-based samples can be provided by forming them with a variety of ribbon forming processes, for example, slot draw, down-draw, fusion down-draw, up-draw, press roll, redraw or float. In even further embodiments, a predetermined particle size (e.g., median particle size, particle size distribution) can be obtained by ball milling the particles. In even further embodiments, the curing agent can comprise dipropylene-glycol diacrylate. In even further embodiments, the dispersant can comprise a phosphate ester. In even further embodiments, the organic binder can comprise one or more of an acrylate, an epoxy, and/or a urethane. In even further embodiments, the composition can be substantially solvent-free. In still further embodiments, the composition can be entirely solvent-free. In even further embodiments, the particles may be mixed with an already-formed mixture of two or more of the photo-initiator, the curing agent, the dispersant, and the binder. In some embodiments, the composition can comprise a viscosity of about 10 milliPascal-seconds (mPa-s) or more, about 50 mPa-s or more, about 100 mPa-s or more, about 300 mPa-s or more, about 500 mPa-s or more, about 1,000 mPa-s or more, about 3,000 mPa-s or more, about 10,000 mPa-s or less, about 7,000 mPa-s or less, about 5,000 mPa-s or less, about 2,000 mPa-s or less, or about 1,000 mPa-s or less. In some embodiments, the composition can comprise a viscosity in a range from about 10 mPa-s to about 10,000 mPa-s, from about 10 mPa-s, to about 7,000 mPa-s, from about 10 mPa-s to about 5,000 mPa-s, from about 10 mPa-s to about 2,000 mPa-s, from about 10 mPa-s to about 1,000 mPa-s, from about 100 mPa-s to about 10,000 mPa-s, from about 100 mPa-s to about 7,000 mPa-s, from about 100 mPa-s to about 5,000 mPa-s, from about 100 mPa-s to about 2,000 mPa-s, from about 100 mPa-s to about 1,000 mPa-s, from about 300 mPa-s to about 10,000 mPa-s, from about 300 mPa-s to about 7,000 mPa-s, from about 300 mPa-s to about 5,000 mPa-s, from about 300 mPa-s to about 2,000 mPa-s, from about 300 mPa-s to about 1,000 mPa-s, from about 500 mPa-s to about 10,000 mPa-s, from about 500 mPa-s to about 7,000 mPa-s, from about 500 mPa-s to about 5,000 mPa-s, from about 500 mPa-s to about 2,000 mPa-s, from about 500 mPa-s to about 1,000 mPa-s, from about 1,000 mPa-s to about 10,000 mPa-s, from about 1,000 mPa-s to about 7,000 mPa-s, from about 1,000 mPa-s to about 5,000 mPa-s, from about 1,000 mPa-s to about 2,000 mPa-s, from about 3,000 mPa-s to about 10,000 mPa-s, from about 3,000 mPa-s to about 7,000 mPa-s, from about 3,000 mPa-s to about 5,000 mPa-s, or any range or subrange therebetween.

After step 101, the method can proceed to step 103 comprising printing the green body 207 using the composition 205. In some embodiments, as shown in FIG. 2, printing the green body 207 using the composition 205 can comprise using a printing apparatus 201. In some embodiments, the printing apparatus 201 can comprise a container 203. In some embodiments, as shown, printing the green body 207 using the composition 205 can comprise depositing the composition 205 to form the green body 207 by pouring the composition 205 from the container 203. In some embodiments, the container can comprise a printer cartridge, a beaker, a pipette (e.g., micropipette), a syringe, or a conduit (e.g., flexible tubing). In some embodiments, the printing apparatus 201 can comprise a stage 209. In some embodiments, as shown, the green body 207 can be deposited onto a stage 209. In further embodiments, as shown, the stage 209 may be translatable in a first direction 211. In further embodiments, as shown, the stage 209 may be translatable in a second direction 213. In even further embodiments, as shown, the stage 209 can be translatable in a first direction 211 and a second direction 213 perpendicular to the first direction 211. In further embodiments, although not shown, the stage can be translatable in a third direction perpendicular to both the first direction and the second direction. In some embodiments, although not shown, movement of the stage in one or more directions may be coordinated with the deposition of the composition by a controller such as a computer numeric controller (CNC) (e.g., following a CAD design). In some embodiments, a layer of the composition may be deposited (e.g., comprising a thickness in a range from about 10 µm to about 1 millimeter). In further embodiments, a plurality of layers can be sequentially deposited to form the green body by building the green body from the plurality of deposited layers. It is to be understood that the printing apparatus 201 can comprise a top-down SLA printer, a bottom-up DLP, or any other printing apparatus known in the art.

After step 103, the method can proceed to step 105 comprising curing the green body 207. As shown in FIG. 3, curing the green body 207 can comprise emitting a light beam from a light source 301. In some embodiments, the light source 301 can comprise a laser, a light-emitting diode (LED), and/or an organic light emitting diode. In further embodiments, the laser can comprise a gas laser, an excimer laser, a dye laser, or a solid-state laser. Example embodiments of gas lasers include helium, neon, argon, krypton, xenon, helium-neon (HeNe), xenon-neon (XeNe), carbon dioxide ($CO_2$), carbon monoxide (CO), coper (Cu) vapor, gold (Au) vapor, cadmium (Cd) vapor, ammonia, hydrogen fluoride (HF), and deuterium fluoride (DF). Example embodiments of excimer lasers include chlorine, fluorine, iodine, or dinitrogen oxide ($N_2O$) in an inert environment comprising argon (Ar), krypton (Kr), xenon (Xe), or a combination thereof. Example embodiments of dye lasers include those using organic dyes, for example, rhodamine, fluorescein, coumarin, stilbene, umbelliferone, tetracene, or malachite green dissolved in a liquid solvent. Example embodiments of solid-state lasers include crystal lasers, fiber lasers, and laser diodes. Crystal-based lasers comprise a host crystal doped with a lanthanide, or a transition metal. Example embodiments of host crystals include yttrium aluminum garnet (YAG), yttrium lithium fluoride (YLF), yttrium othoaluminate (YAL), yttrium scandium gallium garnet (YSSG), lithium aluminum hexafluoride (LiSAF), lithium calcium aluminum hexafluoride (LiCAF), zinc selenium (ZnSe), zinc sulfide (ZnS), ruby, forsterite, and sapphire. Example embodiments of dopants include neodymium (Nd), titanium (Ti), chromium (Cr), cobalt (Co), iron (Fe), erbium (Er), holmium (Ho), thulium (Tm), ytterbium (Yb), dysprosium (Dy), cerium (Ce), gadolinium (Gd), samarium (Sm), and terbium (Tb). Example embodiments of solid crystals include ruby, alexandrite, chromium fluoride, forsterite, lithium fluoride (LiF), sodium chloride (NaCl), potassium chloride (KCl), and rubidium chloride (RbCl). Laser diodes can comprise heterojunction or PIN diodes with three or more materials for the respective p-type, intrinsic, and n-type semiconductor layers. Example embodiments of laser diodes include AlGaInP, AlGaAs, InGaN, InGaAs, InGaAsP, InGaAsN, InGaAsNSb, GaInP, GaAlAs, GaInAsSb, and lead (Pb) salts. Some laser diodes can represent exemplary embodiments because of their size, tunable output power, and ability to operate at room temperature (i.e., about 20° C. to about 25° C.).

In some embodiments, the light source 301 can be configured to emit a light beam comprising an ultra-violet (UV) wavelength or a visible wavelength. In further embodiments, the wavelength of the light beam can be in a range from about 10 nm to about 400 nm, from about 100 nm to about 400 nm, from about 200 nm to about 400 nm, from about 10 nm to about 300 nm, from about 100 nm to about 300 nm, from about 200 nm to about 300 nm, from about 10 nm to about 200 nm, from about 100 nm to about 200 nm, or any range or subrange therebetween. In further embodiments, the operating wavelength range may be over a range of optical wavelengths from about 315 nm to about 400 nm, from about 280 nm to about 315 nm, from about 100 nm to about 280 nm, or from 122 nm to about 200 nm. In further embodiments, the wavelength of the light beam can be in a range from about 300 nanometers (nm) to about 1,000 nm, from about 350 nm to about 900 nm, from about 400 to about 800 nm, from about 500 nm to about 700 nm, or any range or subrange therebetween. In even further embodiments, the wavelength of the light beam can be about 365 nm, about 415 nm, or about 590 nm. In further embodiments, the wavelength of the light beam can correspond with a wavelength that the photo-initiator is sensitive to.

After step 105, the method can proceed to step 113 comprising the end of the process of making a green body 207. In some embodiments, the method of making a green body 207 can proceed sequentially along steps 101, 103, 105, and 113 as described above. In other embodiments, arrow 102 can be followed to go directly from step 103 to step 113, for example, when the green body is not cured. In some embodiments, arrow 106 can be followed to go from step 105 to step 103, for example, when a layer of the composition 205 deposited (e.g., printed) as part of the green-body 207 is cured before printing another layer of the composition 205. In further embodiments, the cycle of printing a layer (e.g., step 103) and then curing the layer (e.g., step 105) can be repeated until the green body is completely printed (e.g., proceeding to step 113). It is to be understood that the above variations can be combined in some embodiments.

Further embodiments of methods of making a printed article of the disclosure will be discussed with reference to FIGS. 2-6 and the flow chart in FIG. 1. In some embodiments, the methods of making a printed article 601 illustrated in FIG. 6 can be provided. For example, the methods can include the first step 101 of creating the composition 205. The first step 101 can proceed as indicated above with reference to step 101 of making the green body 207.

After step 101, the method of making the printed article 601 can proceed to step 103 comprising printing a green body 207 using the composition 205. Step 103 can proceed as indicated above with reference to step 103 of making the green body 207 with reference to FIG. 2.

After step 103, the method can proceed to step 105 comprising curing the green body 207. Step 105 can proceed as indicated above with reference to step 105 of making the green body 207 with reference to FIG. 3.

After step 105, the method can proceed to step 107 comprising heating the cured green body 207 to remove the organic binder to form a porous article 503. In some embodiments, as shown in FIG. 4, heating the cured green body 207 can comprise placing the cured green body 207 in an oven 401 and then heating the cured green body 207 within the oven 401 to form the porous article 503. In some embodiments, substantially all of the organic binder can be removed by heating the cured green body 207. In further embodiments, all of the organic binder can be removed by heating the cured green body 207. In further embodiments, the cured green body 207 can be heated to a temperature of about 250° C. or more, about 350° C. or more, about 400° C. or more, about 1000° C. or less, about 800° or less, or about 600° C. or less. In further embodiments, the cured green body 207 can be heated to a temperature in a range from about 250° C. to about 1000° C., from about 250° C. to about 800° C., from about 250° C. to about 600° C., from about from about 350° C. to about 1000° C., from about 350° C. to about 800° C., from about 350° C. to about 600° C., from about 400° C. to about 1000° C., from about 400° C. to about 800° C., from about 400° C. to about 600° C., or any range or subrange therebetween. In further embodiments, the cured green body 207 can be heated to a temperature in one or more of the above specified ranges for a time of about 20 minutes or more, about 1 hour or more, about 3 hours or more, about 8 hours or more, about 24 hours or less, about 16 hours or less, or about 8 hours or less. In further embodiments, the cured green body 207 can be heated to a temperature in one or more of the above specified range for a time in a range from about 20 minutes to about 24 hours, from about 20 minutes to about 16 hours, from about 20 minutes to about 8 hours, from about 1 hour to about 24 hours, from about 1 hour to about 24 hours, from about 1 hour to about 16 hours, from about 1 hour to about 8 hours, from about 3 hours to about 24 hours, from about 3 hours to about 16 hours, from about 3 hours to about 8 hours, from about 8 hours to about 24 hours, from about 8 hours to about 16 hours, or any range or subrange therebetween. In some embodiments, a plurality of pores 505 can be formed in the porous article 503 corresponding to the space occupied by organic components of the composition (e.g., photo-initiator, curing agent, dispersant, organic binder, and polymerization products of curing).

After step 107, the method can proceed to step 109 comprising sintering the porous article 503 to form the printed article 601. In some embodiments, as shown in FIG. 5, sintering the porous article 503 can comprise placing the porous article 503 in a sintering oven 501 and then heating the porous article 503 in the sintering oven 501 to sinter the porous article 503 into the printed article 601 shown in FIG. 6. In some embodiments, sintering can comprise a process of coalescing (e.g., directly bonding to one another) particles into a solid (e.g., ceramic article, printed article) by heating the without completely liquefying the particles such that any crystal structure of the particles remains in the coalesced body. In further embodiments, sintering can comprise heating the porous article 503 to a temperature of about 500° C. or more, about 1000° C. or more, about 1400° C. or more, about 2000° C. or more, about 3200° C. or less, about 3000° C. or less, about 2500° C. or less, or about 2000° C. or less. In further embodiments, sintering can comprise heating the porous article 503 can be heated to a temperature in range from about 500° C. to about 3200° C., from about 500° C. to about 3000° C., from about 500° C. to about 2500° C., from about 1000° C. to about 3200° C., from about 1000° C. to about 3000° C., from about 1000° C. to about 2500° C., from about 1400° C. to about 3200° C., from about 1400° C. to about 3000° C., from about 1400° C. to about 2500° C., from about 1400° C. to about 2000° C., from about 2000° C. to about 3200° C., from about 2000° C. to about 3000° C., from about 2000° C. to about 2500° C., or any range or subrange therebetween. In further embodiments, sintering can comprise heating the porous article 503 to a temperature in one or more of the above specified range for a time of about 20 minutes or more, about 1 hour or more, about 3 hours or more, about 8 hours or more, about 24 hours or less, about 16 hours or less, or about 8 hours or less. In further embodiments, sintering can comprise heating the porous article 503 to a temperature in one or more of the above specified range for a time in a range from about 20 minutes to about 24 hours, from about 20 minutes to about 16 hours, from about 20 minutes to about 8 hours, from about 1 hour to about 24 hours, from about 1 hour to about 24 hours, from about 1 hour to about 16 hours, from about 1 hour to about 8 hours, from about 3 hours to about 24 hours, from about 3 hours to about 16 hours, from about 3 hours to about 8 hours, from about 8 hours to about 24 hours, from about 8 hours to about 16 hours, or any range or subrange therebetween. In some embodiments, sintering can reduce (e.g., decrease, eliminate) the size and/or number of pores 505 in the porous article 503. In some embodiments, sintering can be associated with a shrinkage relative to the porous article 503 of about 10% or less, about 8% or less, about 5% or less, about 2% or less, about 1% or less, about 1% or more, about 2% or more, or about 5% or more. In some embodiments, sintering can be associated with a shrinkage relative to the porous article 503 in a range from about 1% to about 10%, from about 1% to about 8%, from about 1% to about 5%, from about 1% to about 2%, from about 2% to about 10%, from about 2% to about 8%, from about 2% to about 5%, from about 5% to about 10%, form about 5% to about 8%, or any range or subrange therebetween.

After step 109, the method can proceed to step 111 comprising the end of the process of making a printed article 601. In some embodiments, the method of making a printed article 601 can proceed sequentially along steps 101, 103, 105, 107, 109, and 111 as described above. In some embodiments, arrow 106 can be followed to go from step 105 to step 103, for example, when a layer of the composition 205 deposited (e.g., printed) as part of the green-body 207 is cured before printing another layer of the composition 205. In further embodiments, the cycle of printing a layer (e.g., step 103) and then curing the layer (e.g., step 105) can be repeated until the green body is completely printed (e.g., proceeding to step 107). In some embodiments, arrow 108 can be followed to go from step 107 to step 111, where the printed article produced by the method comprises a porous article 503 as shown in FIG. 5 that is not sintered but may optionally be sintered at a later time. It is to be understood that the above variations can be combined in some embodiments.

EXAMPLES

Various embodiments will be further clarified by the following examples. Table 1 will be used to demonstrate compatibility issues between curing agents and organic binders with particles using particles comprising Corning Gorilla glass as an example. Table 2 will be used to demonstrate issues with wetting particles and the unexpected benefits of using a composition comprising isobornyl acrylate, isobornyl methacrylate, dipropylene glycol diacrylate, BYK 180, and an acrylate organic binder with particles using particles comprising Corning Gorilla glass as an example.

Table 1 presents 31 different curing agents or binders that were mixed with an equal weight of Corning Gorilla glass particles comprising a median particle size of 5 μm. Photomer products are available from IGM Resins. SR, N3D, and Sartomer products are available from Sartomer. Miramer products are available from Miwon. The mixtures were rated on initial reactivity and settling. Initial reactivity is rated on a scale from 0 to 10, where 0 corresponds to no reactivity and 10 is the most reactive (e.g., bubbling, odors, color change, opacity change). Settling ratings were measured in accordance with ASTM D869 as described above with a waiting period of 2 days between mixing and measuring. As described above, settling is rated on a scale from 0 to 10, where 0 corresponds to the worst settling and 10 corresponds to no settling. Acceptable components had an initial reactivity of 2 or less and a settling rating of 6 more.

TABLE 1

Initial Reactivity and Settling Ratings
for Components with Particles

| Example | Component | Initial Reactivity | Settling Rating |
|---------|-----------|--------------------|-----------------|
| A | Photomer 2025 | 10 | 0 |
| B | Photomer 4173 | 10 | 0 |
| C | Photomer 6008 | 10 | 0 |
| D | Miramer 244 | 10 | 0 |
| E | Photomer 6891 | 8 | 0 |
| F | Miramer 2300 | 8 | 0 |
| G | Miramer 240 | 8 | 0 |
| H | Sartomer N3D-P110 | 5 | 0 |
| I | Miwon 244 | 5 | 0 |
| J | Sartomer 2273 | 5 | 0 |
| K | Photomer 4356 | 5 | 0 |
| L | Photomer 4173 | 10 | 6 |

TABLE 1-continued

Initial Reactivity and Settling Ratings
for Components with Particles

| Example | Component | Initial Reactivity | Settling Rating |
|---------|-----------|--------------------|-----------------|
| M | Photomer 5429 | 10 | 8 |
| N | Sartomer 504 | 10 | 8 |
| O | Photomer 2050 | 8 | 8 |
| P | Photomer 2022 | 8 | 6 |
| Q | Photomer 5662 | 5 | 6 |
| R | Photomer 2317 | 1 | 4 |
| S | Miwon 200 | 2 | 8 |
| T | Miwon 2100 | 2 | 8 |
| U | Sartomer 508 | 2 | 6 |
| V | Sartomer 644 | 2 | 8 |
| W | Sartomer 350 | 1 | 6 |
| X | Photomer 4061 | 1 | 6 |
| Y | Photomer 2006 | 1 | 6 |
| Z | Photomer 5662 | 1 | 8 |
| AA | Photomer 4127 | 1 | 8 |
| BB | N3D-I150 | 1 | 8 |
| CC | Photomer 4035 | 1 | 8 |
| DD | Photomer 4369 | 1 | 10 |
| EE | Photomer 2012 | 1 | 10 |

Examples A-K comprised unacceptable reactivity ratings and the worst settling rantings. Examples L-Q comprised unacceptable reactivity ratings but acceptable settling ratings. Example R comprised an acceptable reactivity rating but an unacceptable settling rating. Examples S-EE comprised both an acceptable reactivity rating and an acceptable settling rating. Given that Examples A-EE all comprise acrylate or methacrylate-based compounds, the acceptable performance of Examples S-EE is unexpected in light of the unacceptable performance of examples A-R and the functional similarity of the compounds.

Table 2 presents 7 compositions comprising Corning Gorilla glass with a median particle size of 5 μm such that the glass particles comprised 75% wt of the composition. The mixtures were rated as to whether or not they could be printed as part of an SLA additive manufacturing process. Additionally, comments on the wetting, flow, and/or curing were noted. Example 1 was had only minimal wetting, which made it semi-solid and not SLA printable. Examples 2-5 were not SLA printable, had poor flow properties, and were shear-thickening. Example 6 omitted Sartomer 508 was not SLA printable, did not properly cure, and only partially wetted the glass particles. As can be seen, only Example 7 was SLA printable. Example 7 comprised Byk 180, Photomer 2012, and Sartomer 508. Example 7 had good flow properties, good wetting of the glass particles, and a good cure. Example 7 demonstrates the unexpected benefit of the wetting and printability of 75% particles comprising Byk 180, Photomer 2012, and Sartomer 508 in view of non-printable Examples 1-6.

TABLE 2

Behavior of Compositions

| Example | Byk 180 | Photomer 2012 | Sartomer 508 | SLA Printable | Comments |
|---------|---------|---------------|--------------|---------------|----------|
| 1 | | | | No | Semi-solid, minimal wetting |
| 2 | X | | | No | No flow, strong shear-thickening |
| 3 | | X | | No | No flow, strong shear-thickening |
| 4 | | | X | No | No flow, strong shear-thickening |
| 5 | | X | X | No | No flow, strong shear-thickening |
| 6 | X | X | | No | Nice flow, partial wetting, poor cure |
| 7 | X | X | X | Yes | Nice flow, full wetting, good cure |

The above disclosure provides compositions that can reduce the time and/or cost associated with additive manufacturing, producing green bodies, and/or printed articles. Also, the compositions of the disclosure can comprise high loading (e.g., about 65% by weight or more) of particles with good stability and/or wetting of the particles. Such compositions have decreased (e.g., reduced, no) shear-thickening behavior, which can enable increased processing speeds and/or reduce equipment damage. Such compositions comprise good wetting of particles, which can enable increased stability of the composition (e.g., decreased and/or reduced settling, sedimentation). Such compositions can comprise printable viscosities (e.g., in a range from about 100 milliPascal-seconds (mPa-s) to about 7,000 mPa-s), which can be used in additive manufacturing even when the composition comprises a high loading (e.g., about 65% by weight or more) particles. Providing a composition that is substantially solvent-free can increase the curing rate of the composition, which can decrease processing time. Providing a composition that can be substantially solvent-free can reduce (e.g. decrease, eliminate) the use of rheology modifiers and increase composition homogeneity, which can improve the quality of the resulting green body and/or printed article. Providing a composition that is substantially solvent-free can increase the optical transparency of the resulting green body and/or printed article. Providing a composition comprising a high loading (e.g., about 65% or more by weight) of particles can decrease (e.g., reduce) the materials costs associated with the other components of the composition. Providing a composition comprising particles comprising an accessible surface area that substantially comprises oxides (e.g., a composition without surface modification of the particles and/or coupling agents) can reduce the cost of the composition.

Also, the methods set forth above can additionally produce optically transparent green bodies and/or printed articles exhibiting good dimensional stability and/or mechanical strength. Compositions of the embodiments of the disclosure can be used in methods of making a green body and/or a printed article. As discussed above, methods using the composition of the embodiments of the disclosure can reduce the time and/or cost associated with such methods. Also, methods of the embodiments of the disclosure can produce high-quality green bodies and/or printed articles. Providing a composition comprising a high loading (e.g., about 65% or more by weight) of particles can increase the dimensional stability and/or strength of the green body and/or printed article. Providing a composition comprising a high loading (e.g., about 65% or more by weight) can decrease (e.g., reduce) shrinkage associated with sintering to form a printed article. Providing a composition comprising a high loading (e.g., about 65% or more by weight) can increase optical transparency of the green body and/or printed article. Providing a composition comprising particles comprising an accessible surface area that substantially comprises oxides (e.g., a composition without surface modification of the particles and/or coupling agents) can increase the optical transparency of the green body and/or printed article. Providing a composition that is substantially solvent-free can increase the dimensional stability and/or strength of the green body and/or printed article. Providing a composition that is substantially solvent-free can decrease (e.g., reduce) shrinkage associated with sintering to form a printed article. Providing a composition that is substantially solvent-free can increase optical transparency of the green body and/or printed article.

As used herein, the term "controller" can encompass all apparatus, devices, and machines for processing data, including by way of example a programmable processor, a computer, computer numeric control controller, or multiple processors or computers. The processor can include, in addition to hardware, code that creates an execution environment for the computer program in question, e.g., code that constitutes processor firmware, a protocol stack, a database management system, an operating system, or a combination of one or more of them. In some embodiments, the controller can comprise and/or be implemented in digital electronic circuitry, or in computer software, firmware, or hardware, including the structures disclosed in this specification and their structural equivalents, or in combinations of one or more of them. Embodiments of controllers described herein can be implemented as one or more computer program products (e.g., one or more modules of computer program instructions encoded on a tangible program carrier for execution by, or to control the operation of, data processing apparatus). The tangible program carrier can be a computer-readable medium. The computer-readable medium can be a machine-readable storage device, a machine-readable storage substrate, a memory device, or a combination of one or more of them. A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. The processes described herein can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit) to name a few. Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), to name just a few. Computer-readable media suitable for storing computer program instructions and data include all forms of data memory including nonvolatile memory, media and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry. To provide for interaction with a user, embodiments described herein can be implemented on a computer having a display device, e.g., a CRT (cathode ray tube) or LCD (liquid crystal display) monitor, and the like for displaying information to the user and a keyboard and a pointing device, e.g., a mouse or a trackball, or a touch screen by which the user can provide input to the computer. Other kinds of devices can be used to provide for interaction with a user as well; for example, input from the user can be received in any form, including acoustic, speech, or tactile input. Embodiments described herein can be implemented in a computing system that includes a back-end component, e.g., as a data server, or that includes a middleware component, e.g., an application server, or that includes a front-end component, e.g., a client computer having a graphical user interface or a Web browser through which a user can interact with implementations of the subject matter described herein, or any combination of one or more such back-end, middleware, or front-end components. The components of the system can be interconnected by any form or medium of digital data communication, e.g., a communication network. Embodiments of communication networks include a local area network ("LAN") and a wide area network ("WAN"), e.g., the Internet. The computing system can include clients and servers. A client and server are generally remote from each other and typically interact through a communication network. The relationship of client and server arises from computer programs running on the respective computers and having a client-server relationship to each other.

Directional terms as used herein—for example, up, down, right, left, front, back, top, bottom—are made only with reference to the figures as drawn and are not intended to imply absolute orientation.

It will be appreciated that the various disclosed embodiments may involve features, elements, or steps that are described in connection with that embodiment. It will also be appreciated that a feature, element, or step, although described in relation to one embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. For example, reference to "a component" comprises embodiments having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another embodiment. Whether or not a numerical value or endpoint of a range in the specification recites "about," the numerical value or endpoint of a range is intended to include two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein, unless otherwise noted, are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C. As used herein, the terms "comprising" and "including", and variations thereof shall be construed as synonymous and open-ended unless otherwise indicated.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the embodiments herein provided they come within the scope of the appended claims and their equivalents.

What is claimed is:

1. A composition, comprising:
particles comprising 65% or more by weight of the composition;
a photo-initiator;
a curing agent;
a dispersant;
an organic binder; and
wherein the particles comprise a surface pH of about 9 or more, the photo-initiator, the curing agent, and the dispersant comprise a combined amount in a range from about 1% by weight to about 15% by weight of the composition, the composition is substantially solvent-free, and at least one of the organic binder comprises isobornyl methacrylate, the curing agent comprises dipropylene-glycol diacrylate, or the dispersant comprises a phosphate ester.

2. The composition of claim 1, wherein the composition comprises a viscosity in a range from about 100 milliPascal-seconds to about 7,000 milliPascal-seconds.

3. The composition of claim 2, wherein the viscosity is in a range from about 3,000 milliPascal-seconds to about 5,000 milliPascal-seconds.

4. The composition of claim 1, wherein the particles comprise from about 70% by weight to about 80% by weight of the composition.

5. The composition of claim 1, wherein the surface pH of the particles is in a range from about 10 to about 12.

6. The composition of claim 1, wherein the particles comprise a median particle size in a range from about 3 micrometers to about 7 micrometers.

7. The composition of claim 1, wherein the particles comprise glass-based particles or ceramic-based particles.

8. The composition of claim 1, wherein the composition comprises a settling rating of 6 or more after about 1 day as measured in accordance with ASTM D869.

9. The composition of claim 1, wherein the particles have an accessible surface area comprising substantially entirely oxides.

10. A method of making a printed article, comprising:
printing a green body using a composition comprising:
particles comprising about 65% by weight, or more, of the composition;
a photo-initiator;
a curing agent;
a dispersant; and
an organic binder;
curing the green body; and
wherein an accessible surface area of the particles comprises substantially entirely oxides, the composition is substantially solvent-free, the photo-initiator, the curing agent, and the dispersant comprise a combined amount in a range from about 1% by weight to about 15% by weight of the composition, and at least one of the organic binder comprises isobornyl methacrylate, the curing agent comprises dipropylene glycol diacrylate, or the dispersant comprises a phosphate ester.

11. The method of claim 10, wherein the composition comprises a viscosity in a range from about 100 milliPascal-seconds to about 7,000 milliPascal-seconds.

12. The method of claim 10, wherein the green body is optically transparent.

13. The method of claim 10, wherein the curing comprises impinging ultraviolet or visible light on the green body, the method further comprising:

heating the cured green body to remove the organic binder to form a porous article; and sintering the porous article to form the printed article.

14. The method of claim 13, wherein the printed article is optically transparent.

15. The method of claim 11, wherein the viscosity is in a range from about 3,000 milliPascal-seconds to about 5,000 milliPascal-seconds.

16. The method of claim 10, wherein the particles comprise glass-based particles or ceramic-based particles.

17. The method of claim 10, wherein the particles comprise from about 70% by weight to about 80% by weight of the composition.

18. A composition, comprising:

particles comprising 65% or more by weight of the composition;

a photo-initiator;

a curing agent;

a dispersant;

an organic binder; and wherein the particles comprise a surface pH of about 9 or more, the photo-initiator, the curing agent, and the dispersant comprise a combined amount in a range from about 1% by weight to about 15% by weight of the composition, the composition is substantially solvent-free, and the particles comprise a median particle size in a range from about 3 micrometers to about 7 micrometers.

19. The composition of claim 18, wherein the particles are inorganic particles.

20. The composition of claim 19, wherein the inorganic particles comprise at least one of a glass or a glass-ceramic.

* * * * *